United States Patent [19]

Kondo et al.

[11] 4,269,456

[45] May 26, 1981

[54] ANTI-SKID BRAKE PRESSURE CONTROL SYSTEM WITH COMMON SOLENOID VALVE

[75] Inventors: Toshiyuki Kondo, Anjo; Masamoto Ando, Toyota, both of Japan

[73] Assignee: Aisin Seiki Company, Limited, Kariya, Japan

[21] Appl. No.: 948,915

[22] Filed: Oct. 5, 1978

[30] Foreign Application Priority Data

Oct. 5, 1977 [JP] Japan .................................. 52-120268
Oct. 20, 1977 [JP] Japan .................................. 52-126280
Dec. 22, 1977 [JP] Japan .................................. 52-154957

[51] Int. Cl.³ .............................................. B60T 8/02
[52] U.S. Cl. .................................. 303/115; 303/6 R; 303/119
[58] Field of Search .................... 303/6, 115, 119, 117, 303/24

[56] References Cited

U.S. PATENT DOCUMENTS

| 3,556,609 | 1/1971 | MacDuff ............................ 303/115 |
| 3,588,190 | 6/1971 | Nakano et al. ................... 303/6 C X |
| 3,741,612 | 6/1973 | Ando ................................. 303/115 |
| 3,809,437 | 5/1974 | Inada et al. ...................... 303/115 |
| 4,022,514 | 5/1977 | Kondo et al. .................... 303/117 X |

Primary Examiner—Douglas C. Butler
Attorney, Agent, or Firm—Oblon, Fisher, Spivak, McClelland & Maier

[57] ABSTRACT

An anti-skid brake pressure control system which includes a first brake pressure supply line communicating a first source of a tandem master cylinder with a first wheel cylinder, a second brake pressure supply line communicating a second source of the tandem master cylinder with a second wheel cylinder, a cut off valve mechanism arranged within the first supply line and normally maintained in a open position, a servo member having a power piston to thereby define first and second chambers, a solenoid valve mechanism actuated in response to a wheel locking condition to thereby create a pressure differential between the first and second chambers and to thereby activate the power piston, a brake pressure reducing member including a pressure reducing piston movable in response to movement of the servo member to reduce an effective volume of a variable bore, and a pressure reducing valve mechanism operated in response to movement of the pressure reducing piston to bring both of the wheel cylinders into communication with the variable volume bore.

13 Claims, 9 Drawing Figures

ANTI-SKID BRAKE PRESSURE CONTROL SYSTEM WITH COMMON SOLENOID VALVE

BACKGROUND OF THE INVENTION

1. Field of the Invention

This invention relates to an anti-skid brake pressure control system.

2. Description of the Prior Art

According to present day laws and regulations, independent split brake pressure supply systems have been required and one or more brake pressure supply systems or lines have to assuredly operate when other systems fail to do so. Therefore, conventionally, anti-skid control mechanisms must be arranged for each system and this results in complexity in construction and in large-scale size.

SUMMARY OF THE INVENTION

An object of the present invention, therefore, is to provide an improved anti-skid brake pressure control system which obviates the disadvantages of prior devices.

Another object of the invention is to provide an improved anti-skid brake pressure control system which is simple in construction and is small-scale in size.

Still another object of the invention is to provide an improved anti-skid brake pressure control system where some parts are arranged to be common to all of brake pressure supply lines or systems.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
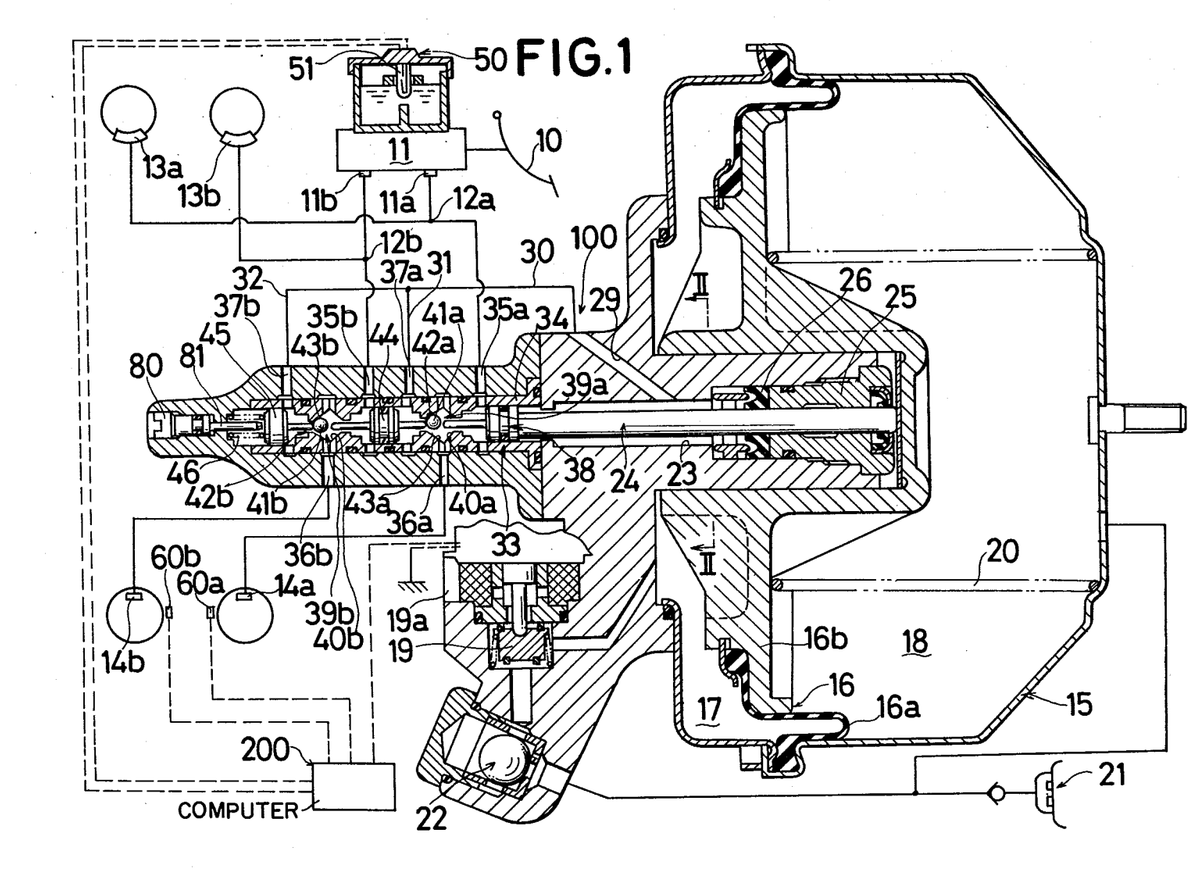
FIG. 1 is a view showing an anti-skid brake pressure control system with a hydraulic pressure control assembly shown in cross-sectional view according to the present invention.
Figure 2:
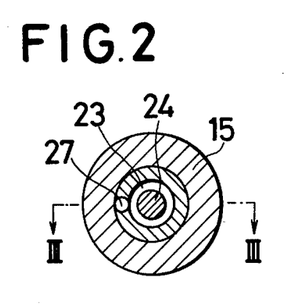
FIG. 2 is a cross-sectional view taken along line II—II of FIG. 1.
Figure 3:
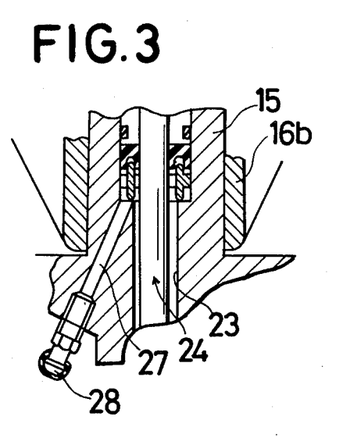
FIG. 3 is a cross-sectional view taken along line III—III of FIG. 2.

Referring now to FIGS. 1 to 3, illustrating a first embodiment of the present invention, a tandem master cylinder 11 operatively connected to a brake pedal 10 has independent ports 11a and 11b for first and second brake pressure supply lines or systems. The port 11a of first brake pressure supply line leads to a front left wheel cylinder 13a from a branch point 12a at one side and to a rear right wheel cylinder 14a through branch point 12a and a hydraulic pressure control assembly 100 at the other side thereof. Port 11b of the second brake pressure supply line leads to a front right wheel cylinder 13b from a branch point 12b at one side and to a rear left wheel cylinder 14b through point 12b and hydraulic pressure control assembly 100.

In this embodiment, the brake pressure supply lines are arranged diagonally, however other brake pressure supply systems such as front and rear wheel split type and left and right wheel split type may be arranged. Similarly, three brake pressure supply lines may be adopted.

The hydraulic pressure control valve assembly 100 comprises a servo mechanism which, in turn, includes a power piston 16 positioned within a housing 15, a variable pressure chamber 17 and a constant pressure chamber 18 divided by the power piston 16 and the housing 15, and a solenoid valve mechanism 19 to change over working pressures to the variable pressure chamber 17. The power piston 16 has a resilient diaphragm 16a and a resinous slidable member 16b.

A spring 20 positioned within the constant pressure chamber 18 continuously biases the power piston 16 to the left. The constant pressure chamber always receives vacuum pressure from an intake manifold 21 and thus constitutes a vacuum or low pressure chamber. Under non-operating conditions wherein the hydraulic pressure control valve assembly 100 is in its illustrated or nonoperation position under normal running condition of the vehicle and normal braking operation, the variable pressure chamber 17 receives vacuum pressure from the intake manifold 21 through vehicle deceleration detecting valve 22 and the solenoid valve mechanism 19. When the solenoid valve means 19 is moved in response to an electrical signal from computer 200, vacuum communication between variable chamber 17 and the intake manifold 21 is interrupted, and the variable chamber 17 now receives atmospheric pressure from atmospheric inlet port 19a. Thus the power piston 16 is movable against spring 20 due to pressure difference between hydraulic pressures within chambers 17 and 18.

A brake pressure reducing mechanism is provided and includes a piston 24 which is slidable within a axial bore 23 formed in the housing 15, and a right end of the piston 24 is brought in contact with the power piston 16. The right end of bore 23 is closed by a plug 25 and a seal 26. As will be seen from FIGS. 2 and 3, the bore 23 is in communication with an air bleed passage 27 which is formed in the housing 15 and an outer end of passage 27 is normally closed by a plug 28. The bore 23 is also connected to a conduit 30 via a passage 29. Branch conduits 33 and 34 from conduit 30 are connected to ports provided in the housing 15.

A cut-off valve mechanism provided in the present invention will be explained hereinafter. An axial bore 34 is formed coaxially with bore 23 and receives a sleeve member 33 therein. The axial bore 34 is adapted to be in communication with six ports, namely, a first inlet port 35a connected to port 11a, a second inlet port 35b connected to port 11b, a first outlet port 36a connected to rear wheel cylinder 14a, a second outlet port 36a connected to rear wheel cylinder 14b, a port 37a connected to conduit 31 and a port 37b connected to conduit 32.

A valve piston 38 is slidably arranged within the sleeve member 33 to thereby interrupt hydraulic communication between both bores 23 and 34. Valve piston 38 is brought in contact with the left end portion of piston 24. A first cut-off valve 39a is arranged within bore 34 between inlet and outlet ports 35a and 36a to thereby control hydraulic communication therebetween. The first cut-off valve 39a includes a seat 40a and a ball 41a. The ball 41a is normally spaced from the seat 40a by a rod portion of the valve piston 38 to assure hydraulic communication between ports 35a and 36a.

A first pressure reducing valve 42a is arranged between ports 37a and 36a to control hydraulic communication therebetween. The valve 42a includes a seat 43a and a ball 41a with ball 41a normally engaged with seat 43a to interrupt hydraulic communication between ports 37a and 36a.

Similarly, a second cut-off valve 39b having seat 40b and ball 41b is positioned between ports 35a and 36b, and a second pressure reducing valve 42b having seat 43b and ball 41b is positioned between ports 37b and 36b. Under normal or illustrated conditions, ball 41b engages with seat 43b and thus port 35b is in communication with port 36b and port 37b is separated from port 36b.

A valve piston 44 is sealingly disposed within bore 34 between first and second cut-off valves 39a and 39b to thereby interrupt hydraulic communication between ports 37 and 35b. A plunger 45 has one end which is in contact with ball 41b and is urged by spring 46 and rod 81, the position of rod 81 being adjusted by screw 80. Reference numeral 50 denotes a reservoir having oil indicating means 51.

In operation, when the brake pedal 10 is depressed, the hydraulic brake pressure generated within one of the tandem master cylinders 11 will be transmitted to wheel cylinder 13a at one side and to wheel cylinder 14a through inlet port 35a, bore 34 and outlet port 36a at the other side. At the same time, the hydraulic brake pressure generated within the other of the tandem master cylinder 11 will be transmitted to wheel cylinder 13b at one side and to wheel cylinder 14b through inlet port 35b, bore 34 and outlet port 36b at the other side. The above-noted brake pressure supply lines are arranged independently so that one of front wheel cylinders and one of rear wheel cylinders will be normally braked even when one of brake supply lines fails to operate.

Under the above-described normal braking operation, both cut-off valves 39a and 39b are maintained at their opening positions by piston 24 which is urged in its illustrated position by the biasing force of spring 20. More particularly, the rod portion of valve piston 38 urges ball 41a so as to be in contact with seat 43a, and ball 41b is urged to be in contact with seat 43b through right and left rod portions of valve piston 44. The biasing force of spring 46 which biases plunger 45 to the right is set so as to have considerably small value so that the parts mentioned above are maintained in their illustrated positions.

When one or both of the rear wheels are substantially locked, conventional computer 200 which is connected to sensors 60a and 60b delivers an electrical signal to solenoid valve 19. Solenoid valve 19 is moved so that the variable pressure chamber 17 is separated from intake manifold 21 and is connected to atmospheric inlet port 19a. Thus a pressure difference between chambers 17 and 18 will now be created and power piston 16 is urged to be moved to the right against spring 20. At this point in time there is no urging force which urges the piston 24 to the left, and thus valve pistons 38 and 44 are moved to the right by master or braking hydraulic pressures within the first and second brake pressure supply lines. Therefore, ball 41a is forced to be in contact with seat 40a by valve piston 44 and ball 41b is forced to be in contact with seat 40b by plunger 45 which is biased by spring 46. Thus both rear wheel cylinders 14a and 14b are separated from tandem master cylinder, respectively. Simultaneously, ball 41a is disengaged from seat 43a and ball 41b is disengaged from seat 43b, and first and second outlet ports 36a and 36b are in communication with ports 37a and 37b, respectively.

Brake hydraulic pressures at rear wheel cylinders 14a and 14b are now transmitted to bore 23 through conduits 31, 32 and 30. Hydraulic pressure transmitted to the bore 23 urges the piston 24 to the right to thereby increase the effective volume of bore 23. Thus hydraulic brake pressures at rear wheel cylinders 14a and 14b are effectively reduced.

When sensors 60a and 60b detect sufficient brake pressure reduction operation, solenoid valve 19 is returned in its original position by another signal from the computer 200. Since vacuum pressure is again introduced within chamber 17 and the pressure difference between chambers 17 and 18 will again disappear, parts of hydraulic pressure control valve assembly 100 will be returned to their original or illustrated positions by spring 20. Thus the brake hydraulic pressures at rear wheel cylinders will again be increased. Thereafter, increases and decreases in brake hydraulic pressures at rear wheel cylinders 14a and 14b will be cyclically repeated to release locking conditions of the wheels without delay of braking operation.

Figure 4:
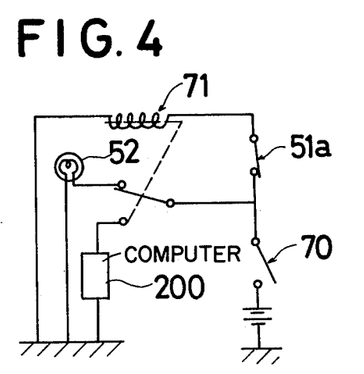
FIG. 4 is a view showing a safety circuit incorporated within the system of FIG. 1.

Upon failure of one of the brake pressure supply lines during anti-skid operation the brake oil indicating mechanism 51 shown in FIG. 4 detects decreases in the quantity of braking oil relating to the failed supply line and turns on an alarm lamp 52 as shown in FIG. 4 illustrating a hydraulic pressure failure detecting circuit. In FIG. 4, when ignition switch 70 is turned on, computer 200 is connected to electric power supply source by relay means 71.

When one of brake pressure supply lines fails to operate and a normally closed switch 51a is turned off by the indicating mechanism 51, the relay 71 is actuated to its illustrated position to thereby disengage computer 200 from power supply source and to thereby turn on lamp 52. Thus computer 200 cannot deliver an electric signal even when the wheels are substantially locked so that the hydraulic control assembly 100 cannot operate.

If the hydraulic control assembly 100 operates upon locking condition of the wheels even when one of brake pressure supply lines fails to operate, even braking operation relating to the other of brake pressure supply lines which is normal will not be completed because brake hydraulic pressures at both of rear wheel cylinders 14a and 14b are arranged to be transmitted to single bore 23. Thus the above hydraulic pressure failure detecting circuit assures normal braking operation relating to the other of the brake pressure supply lines. The switch 70 may be associated with the brake pedal 10.

Figure 5:
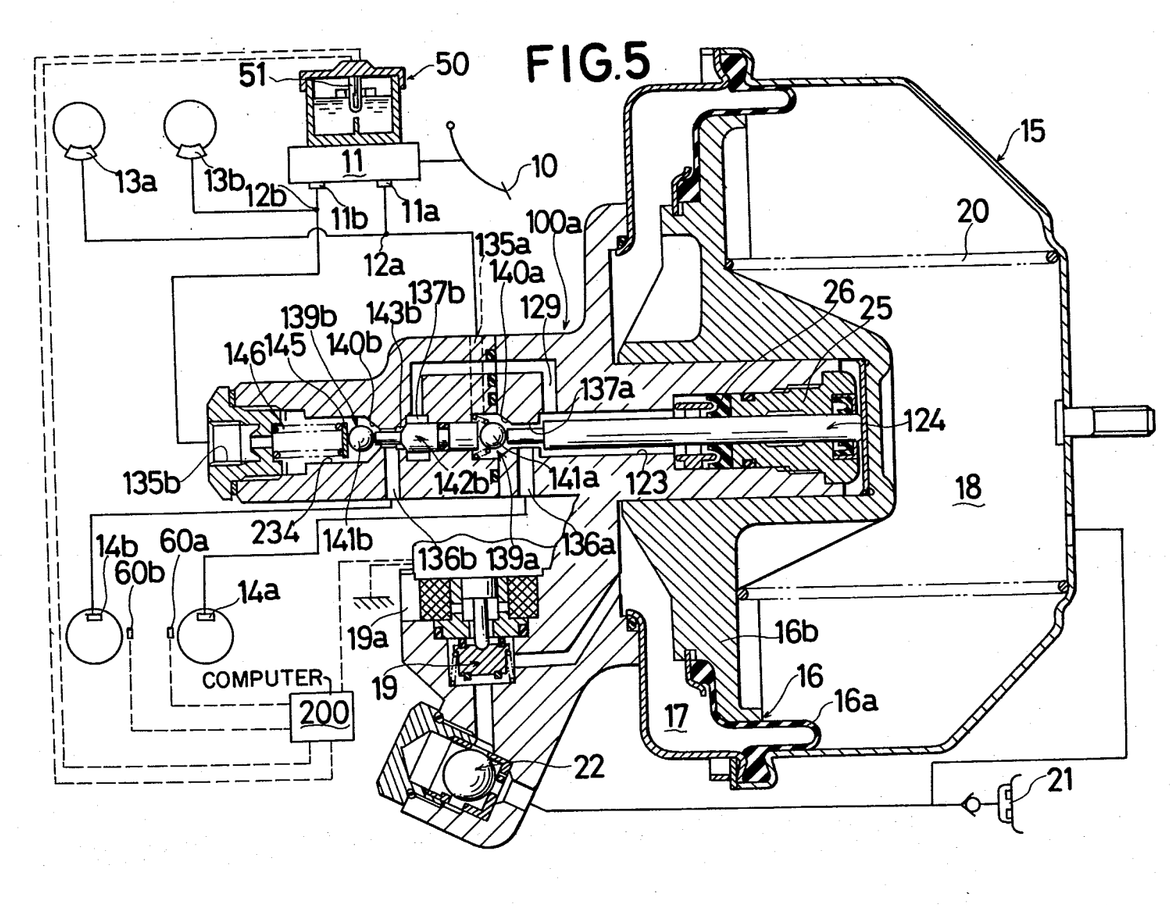
FIG. 5 is a view similar to FIG. 1 but showing a modification of the present invention.

In FIG. 5 showing a modification of the pressure reducing valve, the same parts are represented by the same reference numerals in the previously described embodiment. A small left end of piston 124 is brought in contact with a ball 141a of a first cut-off valve 139a. An axial bore 123 which serves as hydraulic pressure decreasing chamber is normally communicated with a first outlet port 136a through an axial bore 137a. The ball 141a of the cut-off valve 139a which is arranged between inlet and outlet ports 135a and 136a is normally spaced from seat 140a. Similarly, ball 141b of second cut-off valve 139b which is arranged between inlet and outlet ports 135b and 136b is normally spaced from seat 140b.

Bore 123 is connected to port 137b via passage 129. A pressure reducing valve 142b is arranged within an axial bore 234 between first and second cut-off valves 139a and 139b. Valve 142b includes a slidable piston having at the left end thereof a conical portion which is adapted to cooperate with a shoulder 143b so that the on-off hydraulic communication between ports 137b and 136a is thus controlled. The ball 141b is urged to the right by a spring 146 through a plate 145.

In operation, when the computer 200 delivers an electrical signal to actuate the hydraulic control valve assembly 100a, piston 124 is moved to the right in the same manner as in the previous embodiment. Thus both of balls 141a and 141b are urged to the right by springs and master cylinder pressures to be in contact with seats 140a and 140b, respectively. Therefore, transmissions of brake hydraulic pressures to the wheel cylinders will be interrupted. Brake hydraulic pressure at the wheel cylinder 14a is now transmitted to the bore 123 through bore 137a while brake hydraulic pressure at wheel cylinder 14b is also transmitted to bore 123 through the pressure reducing valve 142b, the conical left end portion of which is spaced from shoulder 143b and passage 129. The piston 124 is urged to the right by hydraulic pressure within bore 123 to thereby increase the effective volume of bore 123, and thus brake hydraulic pressures at wheel cylinders 14a and 14b will be decreased.

In this modification, the bore 123 which serves as brake hydraulic pressure reducing chamber normally receives brake hydraulic pressure at the first brake pressure supply line so that only one pressure reducing valve 142b may be arranged. Since the bore 123 is not the airtight or shut-up chamber, only air bleed passage 27 (see FIGS. 2 and 3) may be arranged so that it will not be necessary to provide an adjusting screw for air bleeding which is explained hereinafter.

In the previous embodiment of FIGS. 1 to 3, it is difficult to provide a mechanism for air bleeding since the bore 23 is formed as an airtight or shut-up chamber. Therefore, the air bleed passage 27 which is always in communication with bore 23 is formed and is normally closed by the plug 28. More particularly, after the parts are assembled and brake hydraulic pressures are supplied within brake supply lines, plug 28 is detached during depression of the brake pedal 10. Then bolt 80 is threaded through bore 34. Since the inner rod 81 of bolt 80 is engaged with plunger 45 which is in contact with ball 41b of second cut-off valve 42b, the ball 41b is spaced from seat 43b by bolt 80 which is threaded, and thus ball 41a of first cut valve 42a is spaced from seat 43a through valve piston 44. Therefore, brake hydraulic pressures are transmitted to bore 23, and air within bore 23 is discharged through passage 27. Subsequently plug 28 may be properly arranged and bolt 80 may be returned to its illustrated position.

Figure 6:
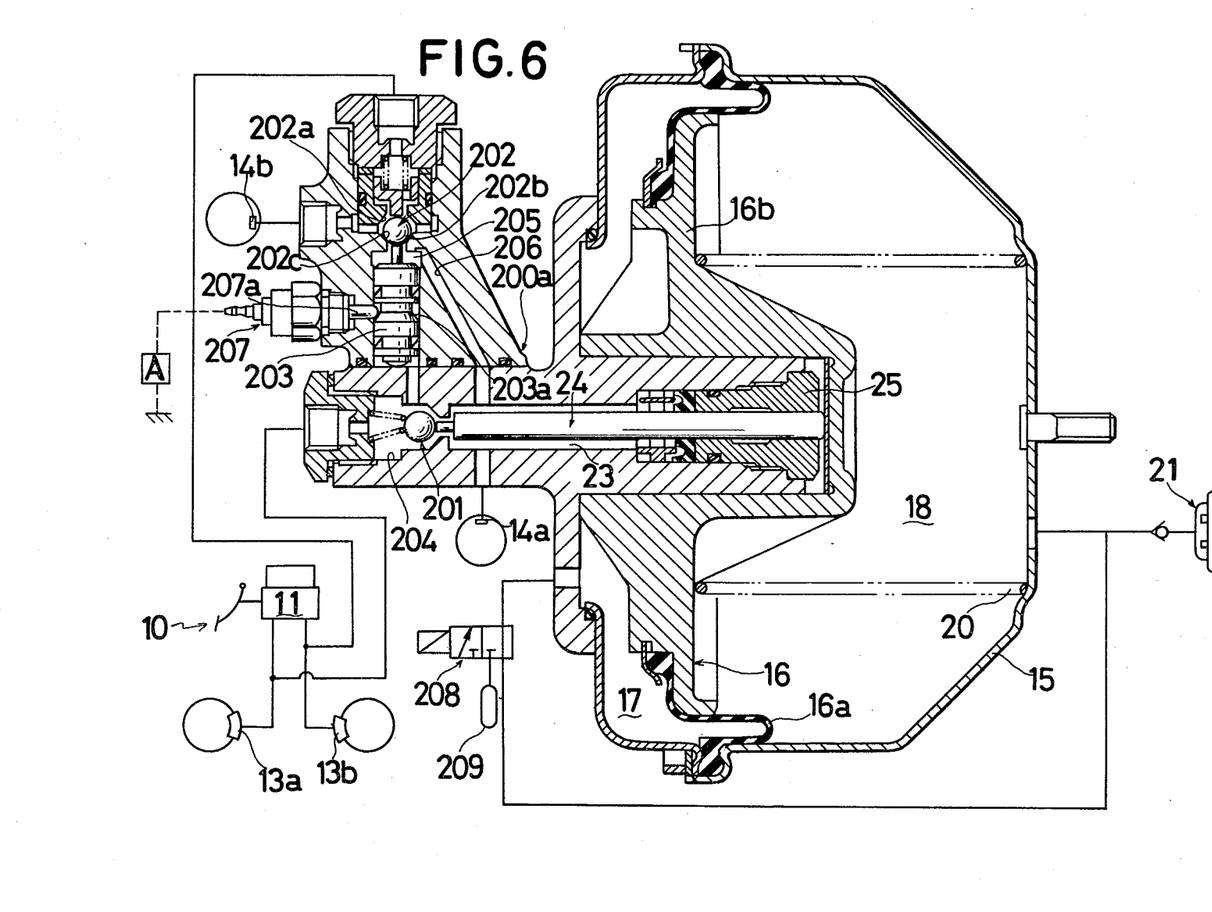
FIG. 6 is a view similar to FIG. 1 but showing a still further modification of the present invention.
Figure 7:
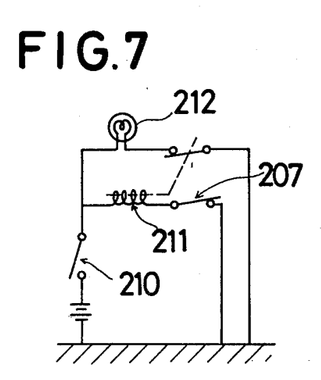
FIG. 7 is a view showing an alarm circuit incorporated within the system of FIG. 6.

Turning to FIGS. 6 and 7 illustrating another embodiment of the present invention, the substantially same parts as those discussed in the previous embodiments are represented by identical reference numerals. The hydraulic pressure control valve assembly 200a includes a first cut-off valve mechanism 201 and a second cut-off valve mechanism 202. The first cut valve mechanism 201 is arranged within a first brake pressure supply line between tandem master cylinder 11 and rear wheel cylinder 13a and is maintained in its opened position during normal brake operation. Similarly, the second cut valve mechanism 202 is arranged within a second brake pressure supply line between tandem master cylinder 11 and rear wheel cylinder 14b and is maintained in its opened position during normal brake operation.

The brake pressure reducing assembly in this embodiment comprises first piston 24 which serves as a first pressure reducing piston and is in contact with cut-off valve 201, a bore 23 which serves as first pressure reducing chamber, and a second pressure reducing piston 203. Piston 203 is balanced by the hydraulic master cylinder pressure within a chamber 204 and the hydraulic pressure within a chamber 205 through a passage 206 and bore 23 and thus, the piston 203 is normally balanced in its illustrated position. The upper end of piston 203 is in contact with cut valve 202 and thus, by upward movement of piston 203, cut-off valve 202 is brought to its closed position wherein ball 202b engages with seat 202a. Under this condition, rear wheel cylinder 14b is now in communication with passage 206 and bore 23. Thus the second cut-off valve 202 including ball 202b and seat 202c also acts as pressure reducing valve.

Piston 203 has at an intermediate portion thereof an annular groove 203a in which an end portion 207a of an alarm assembly 207 is received. The end portion 207a is urged to be moved to the left along a slanting surface during defining groove 203a when the piston 203 is moved. Thus, an electric circuit A which is explained hereinafter is actuated to indicate the brake hydraulic pressure reducing operation to the driver.

A solenoid valve assembly 208 which is adapted to be connected to atmospheric pressure 209 and intake manifold 21 is operated in substantially the same manner as the solenoid valve 19 of the previous embodiments. In FIG. 2, switch circuit A includes an ignition switch 210 and an alarm lamp 212. When ignition switch 210 is closed and the alarming assembly 207 is opened, the lamp 212 is turned on due to arrangement with relay switch 211.

In operation, when the wheels are substantially locked, the solenoid valve 208 is operated by electrical signal from the computor into a position wherein the chamber 17 is separated from communication with intake manifold 21 and is connected to atmospheric source 209. Power piston 16 is moved toward the right in the same manner as in the previous embodiment and piston 24 follows by hydraulic pressure within bore 23. Thus, the end of the piston 24 is disengaged from the valve 201 and, therefore, the valve 201 is brought to its closed position within bore 23 and therefore, the rear wheel cylinders will be separated from the master cylinder. By further movement of piston 24, the effective volume of bore 23 will be reduced to thereby reduce brake hydraulic pressure at rear wheel cylinder 14a. At the same time, since the hydraulic pressure within the chamber 205 is reduced, the piston 203 is moved upwardly by the hydraulic pressure within the chamber 204 so that the second cut-off valve 202 is spaced from seat 202c and is engaged with seat 202a. Thus, rear wheel cylinder 14b is separated from the master cylinder but is connected to chamber 205, namely via bore 23, to thereby reduce brake hydraulic pressure at rear wheel cylinder 14b. By the movement of piston 203, the switch 207 is opened, to turn on the lamp 60.

Figure 8:
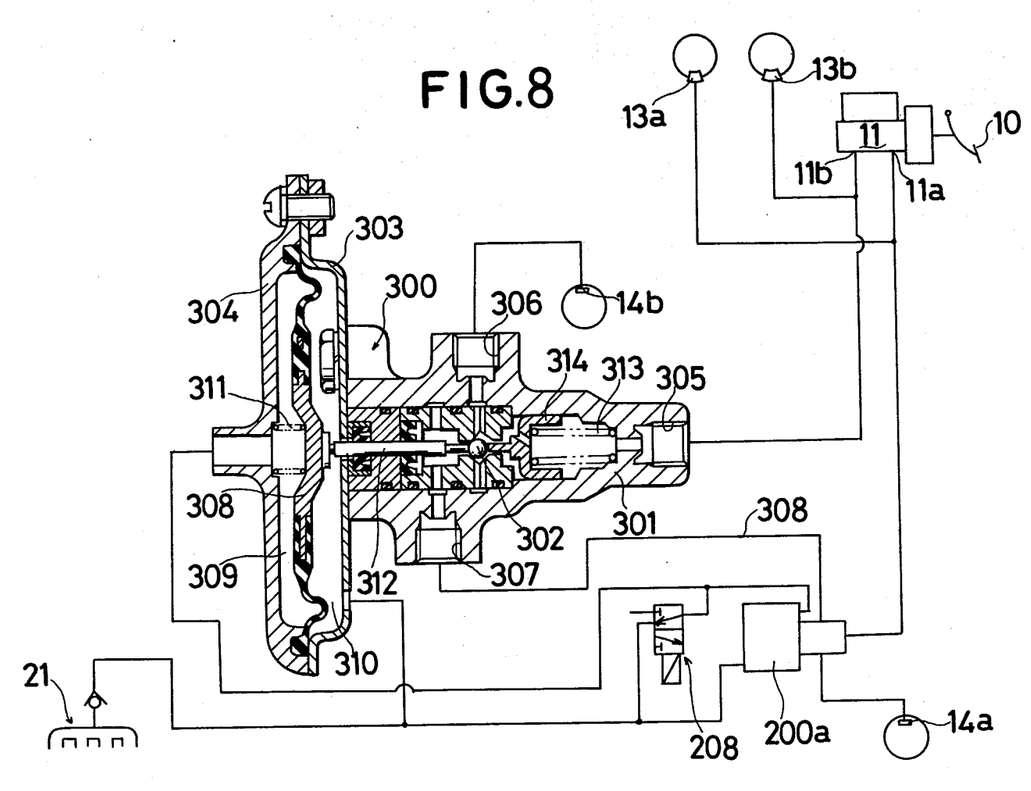
FIG. 8 is a view similar to FIG. 1 but showing a still further modification of the present invention; and, FIG. 9 is a cross-sectional view of the hydraulic pressure control valve assembly of FIG. 8.
Figure 9:
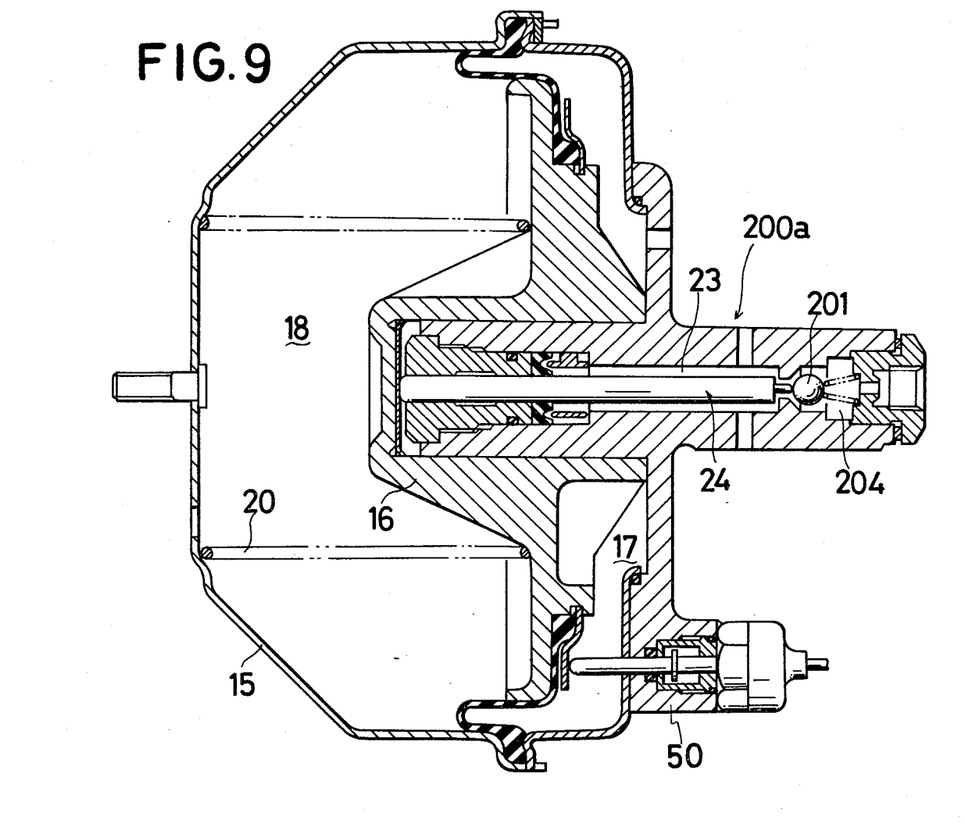

In still another embodiment shown in FIGS. 8 and 9, the substantially same parts will again be represented by corresponding reference numerals as in the previous embodiments, particularly with respect to the construction of hydraulic pressure control valve assembly shown in FIG. 9 as compared to FIG. 6 and thus a detailed explanation thereof will be omitted.

In FIG. 8, control valve assembly 300 includes a housing 301 having a control valve 302 therein and housings 303, 304 having a servo mechanism therein for operating the control valve 302. The housing 302 has a first port 305 which receives the other of the master cylinder pressures from port 11b a second port 306 which is connected to rear wheel cylinder 14b and a third port 307 which is connected to the hydraulic pressure control valve assembly 200a via a conduit 309. The control valve 302 is adapted so as to control hydraulic communication between ports 305, 306 and 307.

The servo mechanism includes a power piston 308 to thereby define a variable pressure chamber 309 and a constant pressure chamber 310. Constant pressure chamber 310 is constantly in communication with the intake manifold 21 while the variable pressure chamber 309 is normally connected to intake manifold 21 but receives atmospheric pressure when the solenoid valve 208 is actuated. Power piston 308 is continuously biased to the right by a spring 311 so that a right end of slidable rod 312 is brought in contact with the control valve 302. Thus control valve 302 is urged to the right by spring 311 through rod 312 and power piston 308 while the control valve is urged to the left by a spring 313 through a retainer 314. Since the biasing force of spring 313 is set to be larger, control valve 302 is normally maintained in its illustrated position such that hydraulic communication between ports p305 and 306 is normally completed.

In operation, when the wheels are substantially locked, solenoid valve 208 is actuated and the hydraulic pressure control valve assembly 200a shown in FIGS. 8 and 9 is operated in substantially the same manner as in the previous embodiments to reduce brake hydraulic pressure at rear wheel cylinder 14a. By the operation of solenoid valve 208, variable pressure chamber 309 of control valve assembly 300 also receives atmospheric pressure so that power piston 208 is urged to the right. Thus the control valve 302 is moved by rod 312 to a position wherein hydraulic communication between ports 305 and 306 is interrupted and hydraulic communication between ports 306 and 307 is completed. Thus, rear wheel cylinder 14b is now connected to bore 23 of FIG. 9, the effective volume of which is now reduced whereby brake hydraulic pressure at rear wheel cylinder is also reduced to release the skid condition of the wheel.

It would be desirable from the standpoint of the feeling of the driver that the operation of control valve assembly 300 be simultaneous with or in advance of operation of hydraulic control valve assembly 200a. In FIG. 9, reference numeral 50 denotes a switch for indicating the returned position of power piston 16.

Obviously, numerous modifications and variations of the present invention are possible in light of the above teachings. It is therefore to be understood that within the scope of the appended claims, the invention may be practiced otherwise than as specifically described herein.

What is claimed is:
1. An anti-skid brake pressure control system which comprises:
   a first brake pressure supply line communicating a first source of a tandem master cylinder with a first wheel cylinder,
   a second brake pressure supply line communicating a second source of the tandem master cylinder with a second wheel cylinder,
   first cut-off valve means arranged within said first supply line and normally maintained in its open position,
   second cut-off valve means arranged within said second supply line and normally maintained in its open position,
   servo means having a power piston to thereby define first and second chambers,
   a single solenoid valve actuated in response to a wheel locking condition to thereby create a pressure differential between said first and second chambers and to thereby actuate said power piston,
   brake pressure reducing means comprising a housing including a variable volume bore provided therein and a pressure reducing piston mounted in said housing movable in response to movement of said servo means to increase an effective volume of said variable volume bore, and
   pressure reducing valve means mounted in said housing operated in response to movement of said pressure reducing piston to bring both of said wheel cylinders into communication with said variable volume bore, and
   means for operating said first and second cut-off valve means in response to operation of said brake pressure reducing means to thereby interrupt hydraulic communication between first and second sources and said first and second wheel cylinders, respectively.

2. An anti-skid brake pressure control system as set forth in claim 1 wherein said housing includes passage means for providing air bleed to atmosphere.

3. An anti-skid brake pressure control system as set forth in claim 1 wherein said housing includes a sleeve member provided therein and wherein said brake pressure reducing means comprises at least one piston valve sealingly disposed within said sleeve member between said first and said second cut-off valve means.

4. An anti-skid brake pressure control system as set forth in claim 3 wherein said pressure reducing valve means further comprises a second and third piston valve sealingly disposed within said sleeve member.

5. An anti-skid brake pressure control system as set forth in claim 1 wherein said first and said second valve means comprises a seat member and a cooperating ball member.

6. An anti-skid brake pressure control system as set forth in claim 1 wherein said brake pressure reducing means comprises at least one piston valve sealingly disposed within said sleeve member between said first and said second cut-off valve means.

7. An anti-skid brake pressure control system as set forth in claim 6, wherein said housing includes passage means communicating said piston valve with said variable volume bore.

8. An anti-skid brake pressure control system which comprises:

a first brake pressure supply line communicating a first source of a tandem master cylinder and a first wheel cylinder, a second brake pressure supply line communicating a second source of the tandem master cylinder and a second wheel cylinder, first cut-off valve means arranged within said first supply line and normally maintained in an open position, a second cut-off valve means arranged within said second supply line and normally maintained in an open position, servo means having a power piston to thereby define first and second chambers, a single solenoid valve actuated in response to a wheel locking condition to thereby create a pressure differential between said first and second chambers and to thereby actuate said power piston, brake pressure reducing means arranged within said first supply line between said first cut-off valve means and said first wheel cylinder, said brake pressure reducing means comprising a housing including a variable volume bore provided therein and a pressure reducing piston mounted in said housing movable in response to movement of said servo means to increase an effective volume of said variable volume bore which is connected to said first wheel cylinder, second cut-off valve actuating means including a working piston movable in response to a pressure differential between hydraulic pressure within said variable volume bore and hydraulic pressure within said first supply line between said first source and said first cut-off valve means to thereby operate said second cut-off valve means, and passage means for connecting said second wheel cylinder to said variable volume bore when said second cut-off valve means is operated by said working piston.

9. An anti-skid brake pressure control system as set forth in claim 8, wherein said first and said second cut-off valve means each comprises a seat member and cooperating ball member.

10. An anti-skid brake control system which comprises:

a first brake pressure supply line communicating a first source of a tandem master cylinder with a first wheel cylinder, a second brake pressure supply line communicating a second source of the tandem master cylinder with a second wheel cylinder, cut-off valve means arranged within said first supply line and normally maintained in an open position, first servo means having a power piston to thereby define first and second chambers, a single solenoid valve actuated in response to wheel locking condition to thereby create a pressure differential between said first and second chambers, brake pressure reducing means arranged within said first supply line between said cut-off valve means and said first wheel cylinder, said brake pressure reducing means comprising a housing including a variable volume bore provided therein and pressure reducing piston mounted in said housing movable in response to movement of said servo means to movement of said servo means to increase an effective volume of said variable volume bore which is connected to said first wheel cylinder, passage means for connecting said variable volume bore and said second wheel cylinder, control valve means arranged within said second supply line and said passage means to thereby selectively communicate said second wheel cylinder to either said second source or said variable volume bore, and second servo means having a power piston to thereby define first and second chambers and controlling operation of said control valve means when a pressure differential between said first and second chambers of said second servo means is created.

11. An anti-skid brake pressure control system as set forth in claim 10, wherein said cut-off valve means comprises a seat member and a cooperating ball member.

12. An anti-skid brake pressure control system as set forth in claim 11, wherein said cut-off valve means further comprises retainer means for engagement with said ball member and biasing means for biasing said retainer means into engagement with said ball member.

13. An anti-skid brake pressure control system which comprises:

a first brake pressure supply line communicating a first source of a tandem master cylinder with a first wheel cylinder;

a second brake pressure supply line communicating a second source of the tandem master cylinder with a second wheel cylinder;

cut-off valve means arranged within said first and second supply line and normally maintained in an open position;

servo means having a power piston to thereby define first and second chambers connected to said cut-off valve means;

a single solenoid valve actuated in response to a wheel locking condition to thereby create a pressure differential between said first and said second chambers and to thereby activate said power piston;

brake pressure reducing means comprising a housing including a variable volume bore provided therein and a pressure reducing piston mounted in said housing movable in response to movement of said servo means to increase an effective volume of said variable volume bore; and pressure reducing valve means mounted in said housing operated in response to movement of said pressure reducing piston to bring both of said wheel cylinders into communication with said variable volume bore.

* * * * *